(12) United States Patent
Krasij et al.

(10) Patent No.: US 6,743,542 B2
(45) Date of Patent: Jun. 1, 2004

(54) INTERFACIAL AND EDGE SEALS FOR UNITIZED ELECTRODE ASSEMBLIES OF FUEL CELL STACK ASSEMBLY

(75) Inventors: Myron Krasij, Avon, CT (US); Michael J. Rajport, Jr., Marlborough, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 269 days.

(21) Appl. No.: 10/114,551

(22) Filed: Apr. 1, 2002

(65) Prior Publication Data

US 2003/0186105 A1 Oct. 2, 2003

(51) Int. Cl.$^7$ ................................................ H01M 2/08
(52) U.S. Cl. ............................. 429/36; 429/35; 429/38
(58) Field of Search ............................ 429/34–36, 38, 429/39

(56) References Cited

U.S. PATENT DOCUMENTS

| | | | |
|---|---|---|---|
| 5,173,373 A | * 12/1992 | Ohsuga | 429/35 |
| 5,360,679 A | 11/1994 | Buswell et al. | |
| 6,399,234 B2 | * 6/2002 | Bonk et al. | 429/32 |
| 6,451,469 B1 | * 9/2002 | Nakamura et al. | 429/36 |
| 2002/0094464 A1 | * 7/2002 | Wangerow | 429/32 |
| 2003/0091885 A1 | * 5/2003 | Kobayashi et al. | 429/32 |

* cited by examiner

*Primary Examiner*—Patrick Ryan
*Assistant Examiner*—Tracy Dove
(74) *Attorney, Agent, or Firm*—Bachman & LaPointe

(57) ABSTRACT

A unitized electrode assembly for a fuel cell stack assembly, includes a membrane electrode assembly having a first side, a second side, a peripheral edge area and a plurality of perforations along the peripheral edge area; a cathode substrate adjacent to the first side; an anode substrate adjacent to the second side; and a seal material bonding the cathode substrate to the anode substrate and extending through the plurality of perforations.

8 Claims, 2 Drawing Sheets

INTERFACIAL AND EDGE SEALS FOR UNITIZED ELECTRODE ASSEMBLIES OF FUEL CELL STACK ASSEMBLY

BACKGROUND OF THE INVENTION

The present invention relates to fuel cell stack assemblies and, more particularly, to improved interfacial and edge seals between components of same.

Solid polymer electrolyte fuel cell power plants are known in the art. One example of a polymer membrane power plant is shown in U.S. Pat. No. 5,360,679, issued Nov. 1, 1994.

Known fuel cell constructions commonly include a proton exchange membrane disposed between cathode and anode plates. As is well known to a person of ordinary skill in the art, the operation of a proton exchange membrane (PEM) fuel cell includes the supply of gaseous fuel and an oxidizing gas (oxidant) to the anode electrode and cathode electrode, respectively. The fuel and oxidant is distributed as uniformly as possible over the active surfaces of the respective electrodes, and an electrochemical reaction takes place between the anode and cathode, with attendant formation of a product of the reaction between the fuel and oxygen, release of thermal energy, creation of an electrical potential difference between the electrodes, and travel of electric charge carriers between the electrodes, with the thus generated electric power usually constituting the useful output of the fuel cell.

Another important component of a typical fuel cell stack assembly is a water transport plate, which is a porous structure filled with water during operation of the fuel cell to supply water locally to maintain humdification of the proton exchange membrane, and to remove product water formed at the cathode, among other things.

Along with the water transport plate, the anode and cathode electrode substrates are also porous. With such porous components, it is necessary to insure that neither liquid, such as product or coolant water in a typical fuel cell, nor any gaseous media such as fuel or oxidant, be able to flow in or out of the periphery or edge of the respective porous components. Various attempts have been made in the prior art to provide a seal design for sealing the peripheral edges of these components. Despite these efforts, problems with such sealing remain.

For example, seals within a fuel cell stack assembly typically have bonds, especially to the membrane component, which have weak bond strength to start with, and this bond strength becomes weaker when the cell is subjected to hot water, for example during normal operation of the cell.

Furthermore, provision of good seals between other components, such as between the water transport plates and adjacent anode and cathode substrates, typically require gaskets and the like, which are larger than may be desirable, and which require relatively deep steps to be machined into the water transfer plate assembly, which weakens an already fragile part.

Based upon the foregoing, it is clear that an improved fuel cell stack assembly is desired which is inexpensive and capable of mass production, which will produce a lower cost assembly with improved performance while simplifying assembly. It is particularly preferred to simplify and improve the edge sealing of components of the fuel cell stack assembly, without sacrificing efficient operation of the cell.

SUMMARY OF THE INVENTION

Based upon the foregoing, it is the primary object of the present invention to provide a fuel cell stack assembly which has improved interfacial and edge seals.

It is a further object of the present invention to provide such an assembly wherein large gaskets are avoided, and deep steps in water transfer plate components are not needed.

It is a further object of the present invention to provide such an assembly wherein the edge seals can be provided as a single impregnating and seal-forming step such that the sealing material penetrates the cathode and anode substrates, as well as perforations in the membrane, and further forms an outwardly facing bead which provides for an excellent seal with adjacent water transport components.

Other objects and advantages of the present invention will appear hereinbelow.

In accordance with the present invention, a unitized electrode assembly for a fuel cell stack assembly is provided, which comprises a membrane electrode assembly having a first side, a second side, a peripheral edge area and a plurality of perforations along said peripheral edge area; a cathode substrate adjacent to said first side; an anode substrates adjacent to said second side; and a seal material bonding said cathode substrate to said anode substrate and extending through said plurality of perforations.

In addition to the membrane electrode assembly, the anode and cathode substrates can advantageously be provided with perforations, and the seal material injected through perforations of both the membrane and substrates, so as to form an excellent seal between the substrates and further to define a bead on outwardly facing surfaces of the substrates which provides for an excellent seal to adjacent components such as water transport plates and the like.

BRIEF DESCRIPTION OF THE DRAWINGS

A detailed description of preferred embodiments of the present invention is provided below, with reference to the attached drawings, wherein.

DETAILED DESCRIPTION

The invention relates to fuel cell stack assemblies and, more particularly, to fuel cell stack assemblies having a unitized electrode assembly wherein components have improved edge seal and interfacial seal properties.

Figure 1:
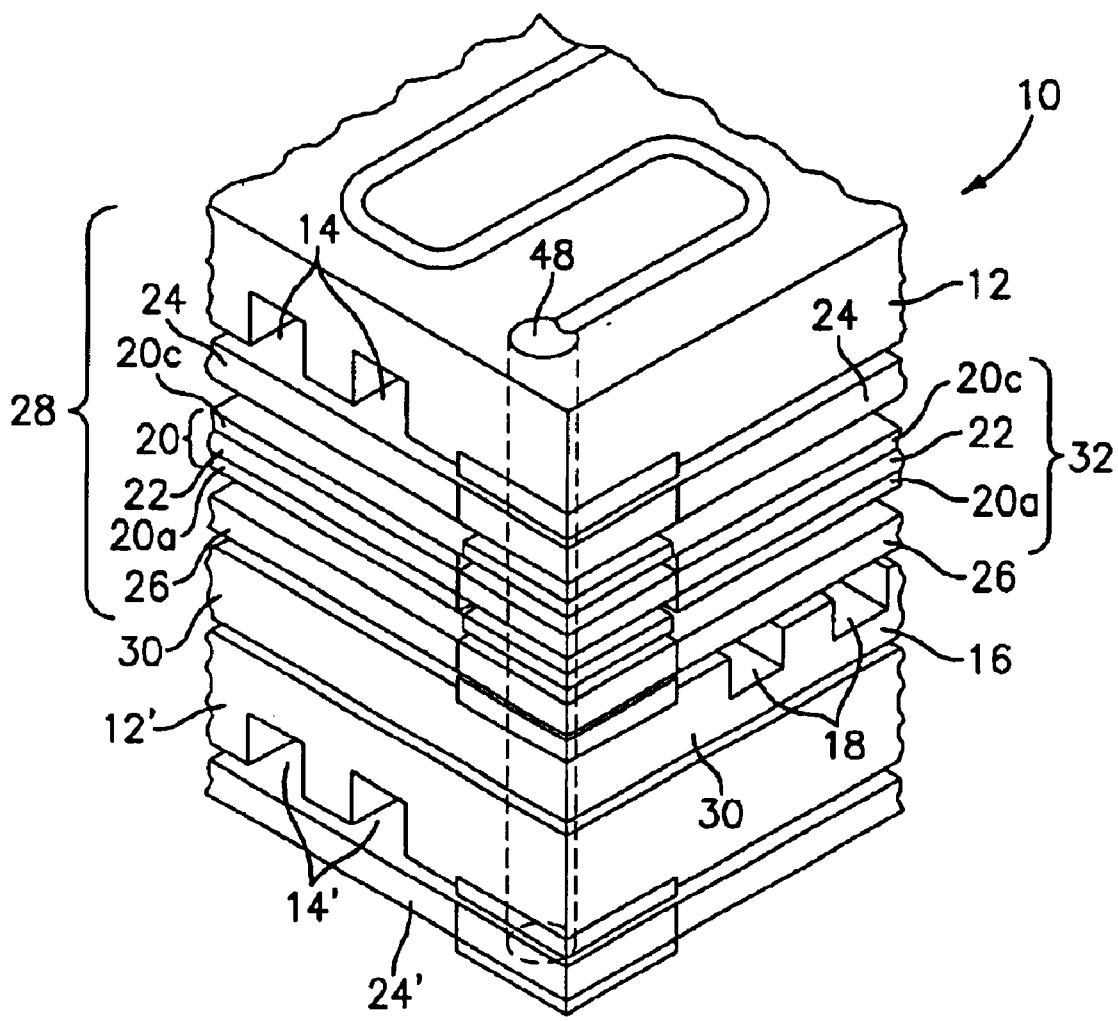
FIG. 1 illustrates a portion of a typical fuel cell stack assembly.

FIG. 1 shows a typical proton exchange membrane (PEM) fuel cell stack assembly 10, and facilitates illustration of the present invention.

Assembly 10 includes a cathode water transport plate 12 having air flow channels 14, and an anode water transport plate 16 having fuel flow channels 18. Additional details of cathode water transport plate 12 and anode water transport plate 16 will be discussed below.

Positioned between plates 12, 16 is a unitized electrode assembly (UEA) 32, which includes a proton exchange membrane 22 having cathode electrode 20c and anode electrode 20a which are sandwiched between a cathode substrate 24 and an anode substrate 26. Unitized electrode assembly 32 with cathode water transport plate 12, and anode water transport 16 collectively define a repeating cell assembly 28 which can advantageously be stacked together in repeating fashion so as to define a cell stack assembly in accordance with the present invention. In this regard, FIG. 1 shows a portion of the next repeating cell assembly 28 including an additional cathode water transport plate 12' and an additional cathode substrate 24'. Further, proton exchange membrane 22, anode electrode 20a and cathode electrode 20c collectively define a membrane electrode assembly (MEA) 20.

As is well known to a person of ordinary skill in the art, many components of unitized electrode assemblies are porous so as to facilitate flow of desired materials therethrough during operation of assembly 10. In order to prevent undesired flow of fluids into and out of cell assembly 10, however, it is necessary to provide seals along edges thereof. These seals are defined along side edges of cathode substrate 24, anode substrate 26, and membrane electrode assembly 20, and further serve to hold components of UEA 32 together. These seals must be sufficiently strong to allow safe operation of assembly 10.

One problem in the industry, however, is that it is extremely difficult to obtain a good seal between cathode, substrate 24 and,anode substrate 26, and membrane electrode assembly 20 positioned therebetween. In accordance with the present invention, it has been found that by positioning perforations along the sealing peripheral edge of MEA 20, sealing material can then be used to bond substrates 24, 26 to opposed faces of MEA 20, while also allowing direct "spot welds" of substrate 24 to substrate 26 through perforations in MEA 20. This provides for excellent increase in bond and seal quality as desired in accordance with the present invention, and is further discussed below.

In addition, it is also critical to obtain a reliable seal between unitized electrode assembly 32 and adjacent cathode water transport plate 12 and anode water transport plate 16. Conventionally, large and relatively hard gaskets and the like are positioned along the periphery of assembly 10 between these components. However, in order to provide a good and reliable seal along with simple assembly, steps must conventionally be machined into plates 12, 16, for example to assure proper location and compressibility of the gasket, and these steps detract from the mechanical strength of the components. In accordance with the present invention, it has been found that sealing material used to bond and seal components within unitized electrode assembly 32 can be positioned so as to define a small bead on outside surfaces of UEA 32, and that this bead can advantageously replace gaskets and the like described above and reduce the depth of the machining steps into transport plates 12, 16, thereby providing excellent seals without structurally weakening components of assembly 10 as desired. This bead is formed integrally with UEA 32.

Figure 2:
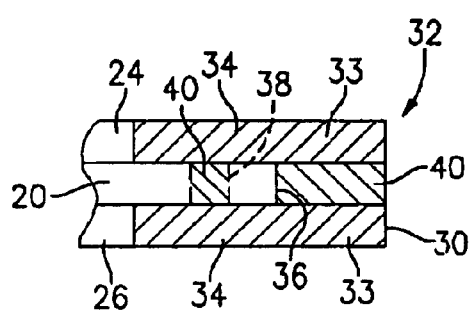
FIGS. 2 and 2a schematically illustrate one embodiment of the present invention, wherein membrane peripheral edges are perforated and sealed with previously impregnated substrates.
Figure 2A:
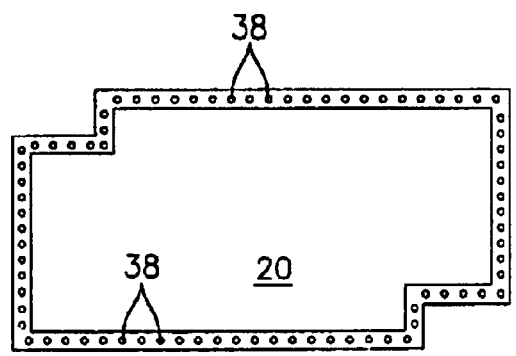

Turning now to FIGS. 2 and 2a, one embodiment of the present invention is further illustrated.

FIG. 2 shows a schematic sectional view taken through a unitized electrode assembly 32, and shows cathode substrate 24 and anode substrate 26 positioned on either side of MEA 20. FIG. 2 shows an edge portion of these components, thus, surface 30 corresponds to a side surface of assembly as is also shown in FIG. 1.

Conventionally, peripheral portions 33 of substrates 24, 26 are sealed against flow by impregnating these members with a suitable material. Thus, the sectioned portion of substrates 24, 26 corresponds to an impregnated edge seal 34, and this seal 34 is preferably formed by extruding a thermoplastic polymer, such as KYNAR, available from West Lake Plastics, into the periphery of the substrate.

Also as shown in FIG. 2, MEA 20 is provided having a slightly smaller periphery than substrates 24, 26, such that substrates 24, 26 extend beyond edge 36 of MEA 20. FIG. 2a shows a top view of MEA 20 along with a preferred arrangement of perforations 38 positioned along the peripheral sealing areas of MEA 20. In this embodiment, MEA 20 is bonded and sealed to substrates 24, 26 along the sealing edge by extruding or otherwise positioning a sealing material 40 between the extending edges of substrate 24, 26 and also through perforations 38. Sealing material 40 may advantageously be a thermoplastic material, such as Thermobond film, available from 3M Corporation, Tedlar, available from DuPont, or any other thermoplastic material which is heat and corrosion resistant, and which has a melting point preferably between 250 and 350° F. and which is compatible with the environment of the fuel cell. This thermoplastic material may be obtained as a film and cut to the desired size and configuration, if desired, or may be provided in other forms as will be discussed below.

In accordance with the embodiment of FIG. 2, components of membrane electrode assembly 20 are bonded together in a manner which is far stronger than previously accomplished, and the "spot welds", wherein sealing material 40 extends through perforations 38 and directly bonds additional portions off substrates 24, 26 together, provides enhanced bond strength and resistance to shear, particularly in conditions of use as desired.

Figure 3:
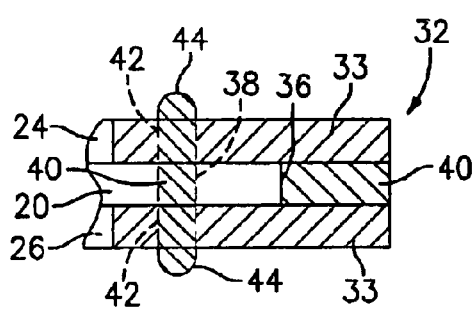
FIGS. 3, 3a and 3b illustrate a further embodiment of the present invention wherein corresponding portions of the substrates are also perforated, and wherein sealing material is injected so as to form sealing beads on outwardly directed surfaces of the substrates.
Figure 3A:
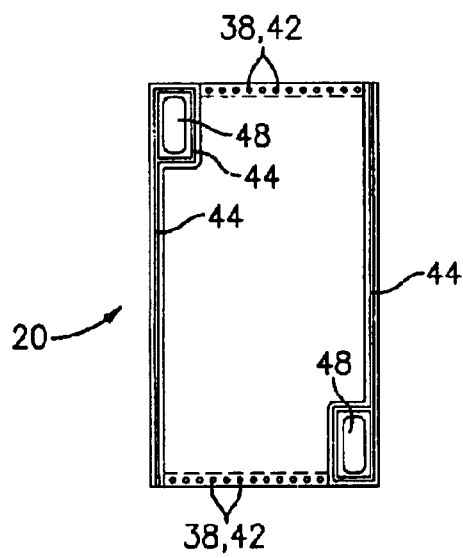
Figure 3B:
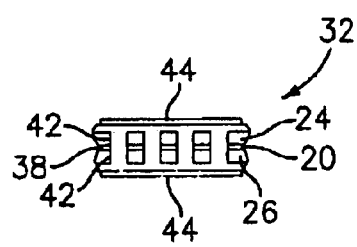

Turning to FIGS. 3, 3a and 3b, a further embodiment of the present invention is illustrated wherein bond and sealing of components within membrane electrode assembly 20 is further enhanced, and wherein a seal bead is defined on outer surfaces of MEA 20 for advantageously sealing against water transport plates 12, 16 as desired. In the embodiment of FIGS. 3–3b, perforations 42 are also provided in substrates 24, 26, for example in substantially the same positions as perforations 38 in MEA 20, such that sealing material 40 can be applied so as to seal between extending edges of substrates 24, 26, and through perforations 38, 42 so as to bond the components as desired and further form sealing bead 44 as shown. Sealing bead 44 advantageously has a small and substantially uniform size and shape which can readily serve as a seal in the place of formerly needed gaskets and the like, and which is fixed to MEA 20, and cannot move out of position during assembly. This allows for simple assembly of repeating cell assemblies 28, wherein water transport plates must seal relative to adjacent substrates without the need for deep cuts and the like to be machined into the water transport plates to accommodate gaskets or other large seal members.

Figure 4:
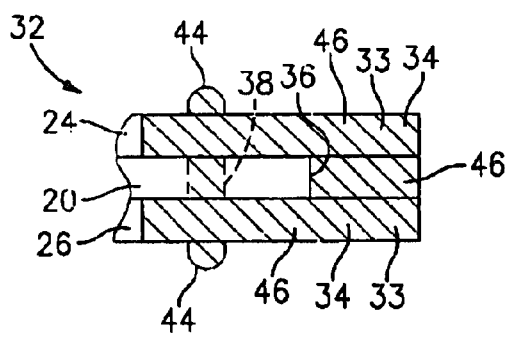
FIG. 4 illustrates a further embodiment in accordance with the present invention wherein non-treated substrates are utilized, and sealing material is injected or impregnated into edges of the substrates, as well as through perforations of the membrane, and also so as to form a sealing bead as desired.

Turning to FIG. 4, a further embodiment of the present invention is illustrated wherein substrates 24, 26 are not pre-impregnated with sealing material. In this embodiment, substrates 24, 26 may or may not be provided with perforations 42 (FIG. 3), as desired. Sealing material 46 in this embodiment is impregnated through edges of substrates 24, 26 so as to form edge seals 34 as desired, and also so as to extend through perforations 38 in MEA 20 and, preferably, to also define a sealing bead 44 as shown. This provides for sealing within repeating cell assembly 28 to be accomplished in a single injection step, which can be performed utilizing suitable and flowable sealing material such as, for example, flowable elastomers, suitable examples of which include but are not limited to silicone, fluoroelastomer, compatible rubber and combinations thereof. In this embodiment, perforations 42 may not be necessary but do help in defining sealing bead 44 has desired.

In each of the foregoing embodiments, the present invention is disclosed as utilizing perforations through MEA 20 so as to improve sealing and bond strength of the substrates on either side of the membrane. In accordance with the present invention, although various sized perforations may be desirable, it has been found that particularly good results can be obtained utilizing perforations having a size of approximately 0.100 in. in diameter. FIG. 2a shows one preferred positioning of such perforations around the peripheral edge of MEA 20, while FIG. 3a further shows perforation location which, in this case, includes perforations through MEA 20 as well as substrates 24, 26. It should further be noted that, as best shown in FIGS. 1 and 3a, coolant ports 48 are also defined through various components of UEA 32, and perforations in MEA 20 and/or substrates 24, 26 in the vicinity of such cooling ports 48 may advantageously be slightly smaller than the remaining perforations. For example, along the outside edges of coolant ports 48, perforations may have a diameter of approximately 0.08 in.

Also referring back to FIG. 3a, sealing bead 44 may desirably be defined along only some edges of UEA 32, for example along two side edges and around cooling ports 48 as illustrated. This depends upon the configuration of the overall fuel cell stack assembly 10, and where sealing with respect to the water transport plates is required. In other embodiments, for example, it may be desirable to have sealing bead 44 extend along all four sides of UEA 32.

In accordance with the present invention, unitized electrode assemblies are provided wherein excellent bond to the membrane is provided which does not substantially deteriorate when exposed to the hot water conditions of use of the cell, and further wherein seal with adjacent water transport plates is also provided without the need for deep machining or cuts into the water transport plates.

The following example demonstrates improved bond strength as obtained in accordance with the present invention.

EXAMPLE

In this example, an improvement in bond strength is demonstrated using lap shear specimens. Two Toray substrate samples, each 1 in.×5 in., were impregnated with Superflex 2500 thermoplastic material. The ends of the samples were overlapped 0.5 in., and a 0.5 in.×1 in. piece of Gore membrane was placed between them. The resulting assembly was placed in a press and the two substrates were bonded to the membrane at 300° F. under a load of 135 psi for 5 minutes. Testing in a Universal Testing Machine showed an average bond strength of 113 psi, and all samples failed by breaking in the substrate. Similar samples were then exposed to 180° F. water for 168 hours, and tested again. On these samples, the average bond strength was 36 psi. As demonstrated, conventional bonding provides for a bond strength which is significantly weakened when exposed to typical operating conditions for a fuel cell. Further, these exposed samples presented failure mode which was 100% adhesive to the membrane.

Similar samples were then prepared in accordance with the present invention, utilizing a perforated membrane. The membrane had three 0.100 in. perforations across the 1 in. width. After exposure to 180° F. water for 168 hours, this perforated sample in accordance with the present invention presented an average bond strength of 82 psi, which is a substantial improvement over conventional bond strength. Further, and significantly, the failure mode of these samples was adhesive to the membrane up to the perforations. At the perforations, the samples failed by breaking in the Superflex 2500 spot welds. Thus, it is clear that sealing through perforations in the membrane in accordance with the present invention provides for enhanced bond strength as desired.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A unitized electrode assembly for a fuel cell stack assembly, comprising:
   a membrane electrode assembly having a first side, a second side, a peripheral edge area and a plurality of perforations along said peripheral edge area;
   a cathode substrate adjacent to said first side;
   an anode substrate adjacent to said second side; and
   a seal material bonding said cathode substrate to said anode substrate and extending through said plurality of perforations.

2. The assembly of claim 1, wherein said cathode substrate and said anode substrate have extending portions which extend beyond said peripheral edge area of said membrane electrode assembly, and wherein said seal material is also disposed between said extending portions.

3. The assembly of claim 1, wherein at least one of said cathode substrate and said anode substrate has substrate perforations, and wherein said seal material extends through said substrate perforations.

4. The assembly of claim 3, wherein each of said cathode substrate and said anode substrate has a membrane electrode assembly facing side and an outward facing side, and wherein said seal material extends through said substrate perforations and defines a seal bead along said outward facing side of at least one of said cathode substrate and said anode substrate.

5. The assembly of claim 4, further comprising at least one water transport plate positioned adjacent to at least one of said cathode substrate and said anode substrate, said seal bead defining a seal between said outward facing side and said water transport plate.

6. The assembly of claim 1, wherein said cathode substrate and said anode substrate are permeable to said seal material and wherein portions of said cathode substrate and said anode substrate corresponding to said perforations are impregnated with said seal material.

7. The assembly of claim 1, wherein said seal material is a flowable elastomer.

8. The assembly of claim 1, wherein said seal material is selected from the group consisting of silicone, fluoroelastomer, rubber and combinations thereof.

* * * * *